(12) United States Patent
Sawada

(10) Patent No.: US 8,134,763 B2
(45) Date of Patent: Mar. 13, 2012

(54) COLOR CONVERSION APPARATUS AND COLOR CONVERSION METHOD

(75) Inventor: Kazuhide Sawada, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 706 days.

(21) Appl. No.: 12/184,816

(22) Filed: Aug. 1, 2008

(65) Prior Publication Data

US 2009/0033966 A1    Feb. 5, 2009

(30) Foreign Application Priority Data

Aug. 3, 2007    (JP) ................................. 2007-203153

(51) Int. Cl.
*G03F 3/08*    (2006.01)
*G06K 9/00*    (2006.01)
(52) U.S. Cl. .......................... 358/523; 358/529; 382/167
(58) Field of Classification Search .................. 358/523, 358/524, 529, 518, 1.15; 382/167, 162
See application file for complete search history.

(56) References Cited

U.S. PATENT DOCUMENTS

| | | | | |
|---|---|---|---|---|
| 4,974,254 A * | 11/1990 | Perine et al. | ............. | 379/100.11 |
| 5,550,921 A | 3/1996 | Reutz | | |
| 5,621,539 A * | 4/1997 | Brown et al. | ................. | 358/400 |
| 5,963,201 A * | 10/1999 | McGreggor et al. | .......... | 715/722 |
| 6,266,159 B1 * | 7/2001 | Otsuka et al. | ................. | 358/405 |
| 6,323,969 B1 * | 11/2001 | Shimizu et al. | ............... | 358/523 |
| 7,116,433 B1 * | 10/2006 | Toyoda | ........................ | 358/1.15 |
| 7,706,036 B2 * | 4/2010 | Yoshida et al. | ............... | 358/521 |
| 7,940,434 B2 * | 5/2011 | Inoue | ........................... | 358/518 |
| 2002/0054307 A1 | 5/2002 | Matsuoka | | |
| 2003/0163431 A1 * | 8/2003 | Ginter et al. | ..................... | 705/64 |
| 2004/0230807 A1 * | 11/2004 | Baird et al. | .................... | 713/182 |
| 2005/0206929 A1 * | 9/2005 | Tsuji | .............................. | 358/1.9 |
| 2005/0248784 A1 * | 11/2005 | Henley et al. | .................. | 358/1.9 |
| 2005/0257247 A1 * | 11/2005 | Moriconi et al. | ................. | 726/2 |
| 2006/0064389 A1 * | 3/2006 | Doll-Steinberg | ............... | 705/59 |

(Continued)

FOREIGN PATENT DOCUMENTS

JP    6-225131    8/1994

(Continued)

*Primary Examiner* — Madelein A Nguyen
(74) *Attorney, Agent, or Firm* — Scully, Scott, Murphy & Presser, PC

(57) ABSTRACT

A color conversion apparatus is for converting an input point defined in a three-dimensional first color space into an output point defined in a three-dimensional second color space. The color conversion apparatus includes: a position identifying unit; a first conversion unit; a second conversion unit; and an output point identifying unit. The position identifying unit identifies a two-dimensional position for the input point, the two-dimensional position being defined on a specific plane passing through a first white point, a first black point and the input point, the first white point and the first black point being defined in the first color space. The first conversion unit converts the input point into an intermediate point that is defined in a device-independent color space. The second conversion unit converts the intermediate point into a temporary output point that is defined in the three-dimensional second color space. The output point identifying unit identifies, in the second color space, an output point, whose position defined on a plane that passes through a second white point, a second black point and the temporary output point corresponds to the two-dimensional position identified by the position identifying unit, the second white point and the second black point being defined in the second color space.

6 Claims, 15 Drawing Sheets

U.S. PATENT DOCUMENTS

| | | | |
|---|---|---|---|
| 2007/0030498 A1* | 2/2007 | Hori et al. | 358/1.9 |
| 2007/0030499 A1* | 2/2007 | Hori | 358/1.9 |
| 2007/0229868 A1* | 10/2007 | Kanai | 358/1.9 |
| 2009/0178111 A1* | 7/2009 | Moriconi et al. | 726/1 |

FOREIGN PATENT DOCUMENTS

| | | |
|---|---|---|
| JP | 2001-86353 | 3/2001 |
| JP | 2002-33929 | 1/2002 |

* cited by examiner

INPUT RGB DATA

CONVENTIONAL METHOD
(MAPPING IS REALIZED IN
DIRECTION OF SATURATION)

EMBODIMENT

COLOR CONVERSION APPARATUS AND
COLOR CONVERSION METHOD

CROSS REFERENCE TO RELATED
APPLICATION

This application claims priority from Japanese Patent Application No. 2007-203153 filed Aug. 3, 2007. The entire content of the priority application is incorporated herein by reference.

TECHNICAL FIELD

The present invention relates to a color conversion apparatus and a color conversion method for converting an input point in a first color space into an output point in a second color space.

BACKGROUND

Conventionally, a color gamut mapping process needs to be executed in a device-independent color space in order to perform color matching on two devices that are different from each other in terms of color gamut. More specifically, an input point in the first color space that is dependent on the first device is converted to a point in a color space such as a CIELAB color space that is device-independent. Subsequently, processes including a color gamut compression process (gamut mapping process) are executed in the device-independent color space and then the point is converted to an output point of the second color space that is dependent on the second device. The gamut mapping process is generally executed, maintaining the hues in the device-independent color space as described in Japanese Patent Application Publication No. 06-225131.

However, with the above-described gamut mapping process, the color gradations can be damaged severely by the gamut mapping when the gamut contour differs remarkably between the first color space and the second color space.

SUMMARY

In view of this problem, an object of the present invention is to provide a color conversion apparatus and a color conversion method that performs color conversions while maintaining hues and the color gradations in an original color image.

In order to attain the above and other objects, the present invention provide a color conversion apparatus for converting an input point defined in a three-dimensional first color space into an output point defined in a three-dimensional second color space. The color conversion apparatus includes: a position identifying unit; a first conversion unit; a second conversion unit; and an output point identifying unit. The position identifying unit identifies a two-dimensional position for an input point defined in a three-dimensional first color space, the two-dimensional position being defined on a specific plane passing through a first white point, a first black point and the input point, the first white point and the first black point being defined in the first color space. The first conversion unit converts the input point into an intermediate point that is defined in a device-independent color space. The second conversion unit converts the intermediate point into a temporary output point that is defined in a three-dimensional second color space. The output point identifying unit identifies, in the second color space, an output point, whose position, defined on a plane that passes through a second white point, a second black point and the temporary output point, corresponds to the two-dimensional position identified by the position identifying unit, the second white point and the second black point being defined in the second color space.

According to another aspect, the present invention provides a color conversion method for converting an input point defined in a three-dimensional first color space into an output point defined in a three-dimensional second color space. The color conversion method includes: identifying a two-dimensional position for an input point defined in a three-dimensional first color space, the two-dimensional position being defined on a specific plane passing through a first white point, a first black point and the input point, the first white point and the first black point being defined in the first color space; converting the input point into an intermediate point that is defined in a device-independent color space; converting the intermediate point into a temporary output point that is defined in a three-dimensional second color space; and identifying, in the second color space, an output point, whose position, defined on a plane that passes through a second white point a second black point and the temporary output point, corresponds to the two-dimensional position identified by the position identifying unit, the second white point and the second black point being defined in the second color space.

According to another aspect, the present invention provides a computer readable medium storing a set of color conversion program instructions. The instructions include: identifying a two-dimensional position for an input point defined in a three-dimensional first color space, the two-dimensional position being defined on a specific plane passing through a first white point, a first black point and the input point, the first white point and the first black point being defined in the first color space; converting the input point into an intermediate point that is defined in a device-independent color space; converting the intermediate point into a temporary output point that is defined in a three-dimensional second color space; and identifying, in the second color space, an output point, whose position, defined on a plane that passes through a second white point, a second black point and the temporary output point, corresponds to the two-dimensional position identified by the position identifying unit, the second white point and the second black point being defined in the second color space.

BRIEF DESCRIPTION OF THE DRAWINGS

FIG. 7(a) and FIG. 7(b) are schematic diagrams showing how input RGB data is converted into intermediate Lab data, wherein FIG. 7(a) shows an input profile in the form of a three-dimensional lookup table, and FIG. 7(b) shows how an interpolation calculation is executed;

FIGS. 14(a) to 14(d) are schematic illustrations of the effect of maintaining the color gradations in device colors through a gamut mapping according to the embodiment, wherein FIG. 14(a) shows an input color gamut, FIG. 14(b) shows an output color gamut, FIG. 14(c) shows a conventional gamut mapping, FIG. 14(d) shows the gamut mapping according to the embodiment.

DETAILED DESCRIPTION

Now, an embodiment of the present invention will be described in greater detail by referring to the accompanying drawings.

Figure 1:
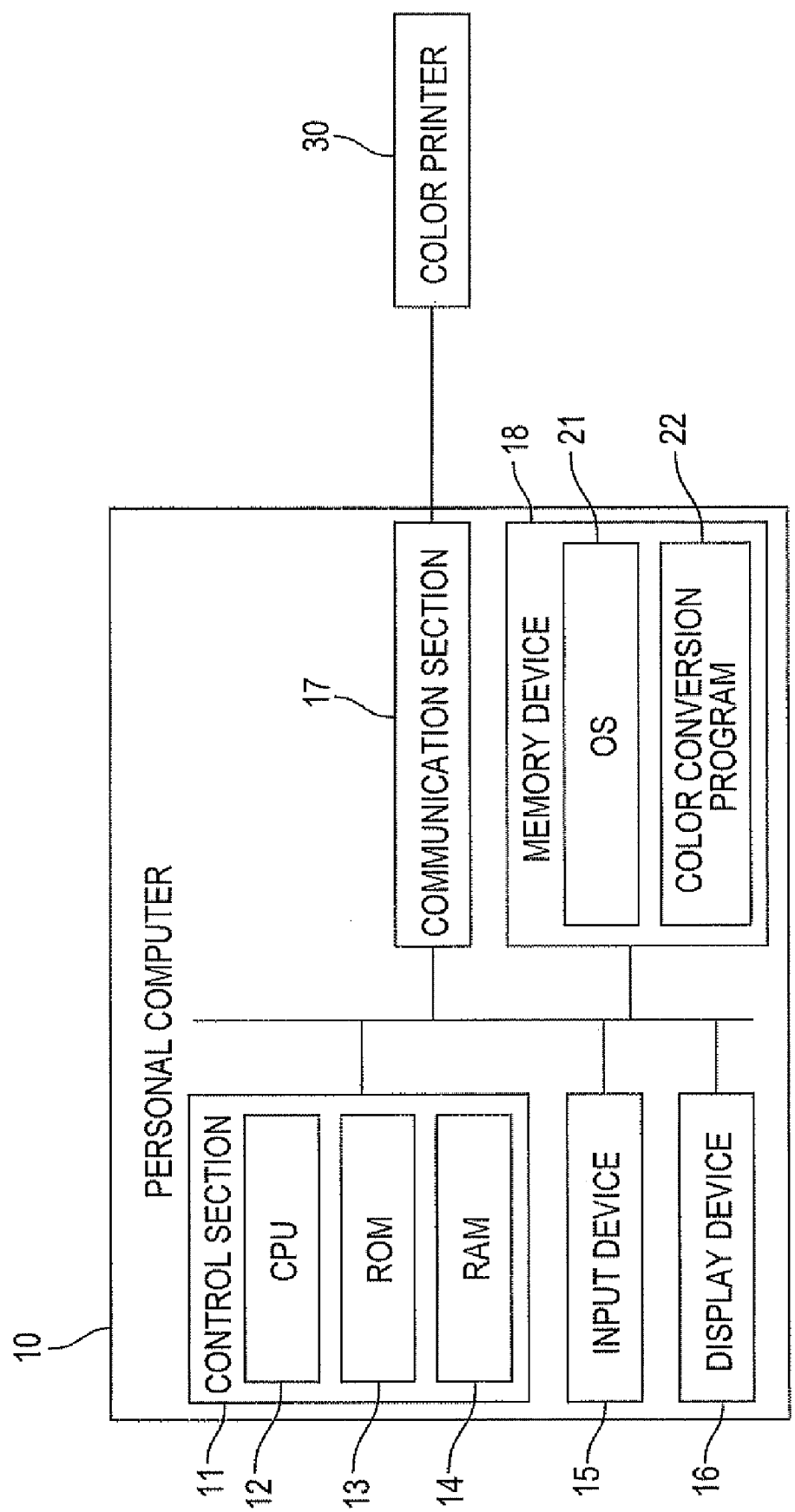
FIG. 1 is a schematic block diagram of a personal computer according to an embodiment of the present invention, showing the configuration thereof.

FIG. 1 is a schematic block diagram of a personal computer as a color conversion apparatus according to the embodiment.

As shown in FIG. 1, the personal computer 10 includes a control section 11, an input device 15, a display device 16, a communication section 17 and a memory device 18. The control section 11 is formed by using a microcomputer that includes a CPU 12, a ROM 13 and a RAM 14 and comprehensively controls the components of the personal computer 10.

The input device 15 is provided to receive externally-inputted user commands. The input device 15 typically includes a keyboard and a pointing device (e.g., a mouse). The display device 16 is provided to display color images that are expressed in terms of RGB values. The display device 16 may typically be a liquid crystal display.

The communication section 17 executes processes of transmitting and receiving data by way of a network. In this embodiment, the personal computer 10 can communicate with a color printer 30 by way of a network (which is a LAN: local area network in this embodiment). The color printer 30 has a function of receiving color image data expressed by RGB values from the personal computer 10 and printing an image of the color image data on a recording medium which may be a sheet of paper.

The memory device 18 stores various pieces of information and may typically be a hard disk drive. An operating system (OS) 21 and a color conversion program 22 are installed in the memory device 18. The color conversion program 22 is for causing the control section 11 to execute a color conversion process of converting an input point in a device color space that is dependent on the display device 16 (input RGB data) into an output point in another device color space that is dependent on the color printer 30 (output RGB data).

Now, the color conversion process that the control section 11 of the personal computer 10 executes according to the color conversion program 22 will be described below.

As described above, with conventional color conversion processes, a color gamut mapping process is executed in a device-independent color space in order to perform color mapping of two devices that are different from each other in terms of color gamut.

Figure 2:
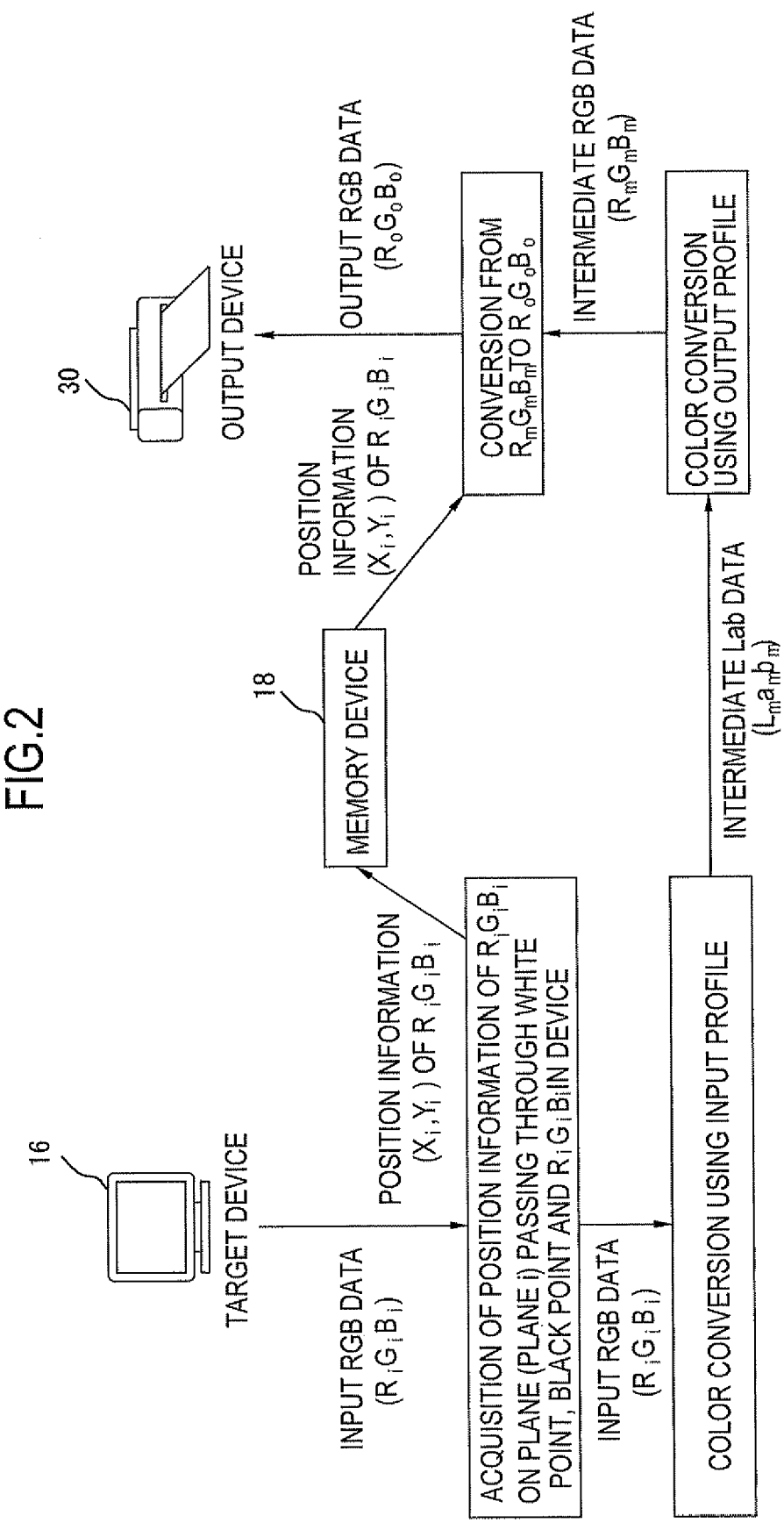
FIG. 2 is a schematic illustration of a color conversion method according to the embodiment for converting input RGB data into output RGB data.

On the other hand, with the color conversion process of this embodiment, a gamut mapping process that can maintain color gradations is executed in a device-dependent color space (RGB space, in this example). FIG. 2 is a schematic illustration of the color conversion method, according to the embodiment, for converting a set of input RGB data $(R_i G_i B_i)$ defined in a device color space (RUB space) that is dependent on the display device 16 into a set of output RUB data $(R_o G_o B_o)$ defined in a device color space (RGB space) that is dependent on the color printer 30. Note that the display device 16 operates as target device, whereas the color printer 30 operates as output device.

A plane i (see a left side of FIG. 4) that passes through three points including the white point, the black point and an input RUB point defined by the input RGB data $(R_i G_i B_i)$ in the device color space that is dependent on the target device is identified. It is noted that the black point and the white point are defined as points that are located on an achromatic axis and that have the minimum and maximum values of lightness, respectively, in the device color space for the target device. Then a two-dimensional position $(X_i, Y_i)$ of the input RGB point $(R_i G_i B_i)$ defined on the plane i is identified. Then, the identified two-dimensional position $(X_i, Y_i)$ is stored in the memory device 18. It is noted that any plane that passes through the white point and the black point in the device-dependent color space is defined as a constant hue plane that has a constant hue in the device-dependent space.

Then, the set of input RGB data $(R_i G_i B_i)$ is converted into a set of intermediate Lab data $(L_m a_m b_m)$ that indicates a point of the input RGB data $(R_i G_i B_i)$ in the device-independent color space (the CIELAB space in this embodiment) by means of a profile of the target device (input profile).

The intermediate Lab data set $(L_m a_m b_m)$ is further converted into a set of intermediate RGB data $(R_m G_m B_m)$ that is a point of the input RGB data $(R_i G_i B_i)$ in the output device-dependent color space by means of a profile of the output device (output profile).

Then, a plane m (see FIG. 11) that passes through the white point, the black point and the intermediate RGB data $(R_m G_m B_m)$ in the device color space of the output device is identified and a position on the plane m that corresponds to the two-dimensional position $(X_i, Y_i)$ stored in the memory device 11 is defined as an output RGB data set $(R_o G_o B_o)$. It is noted that the black point and the white point are defined as points that are located on the achromatic axis and that have the minimum and maximum values of lightness, respectively, in the device color space for the output device.

Figure 3:
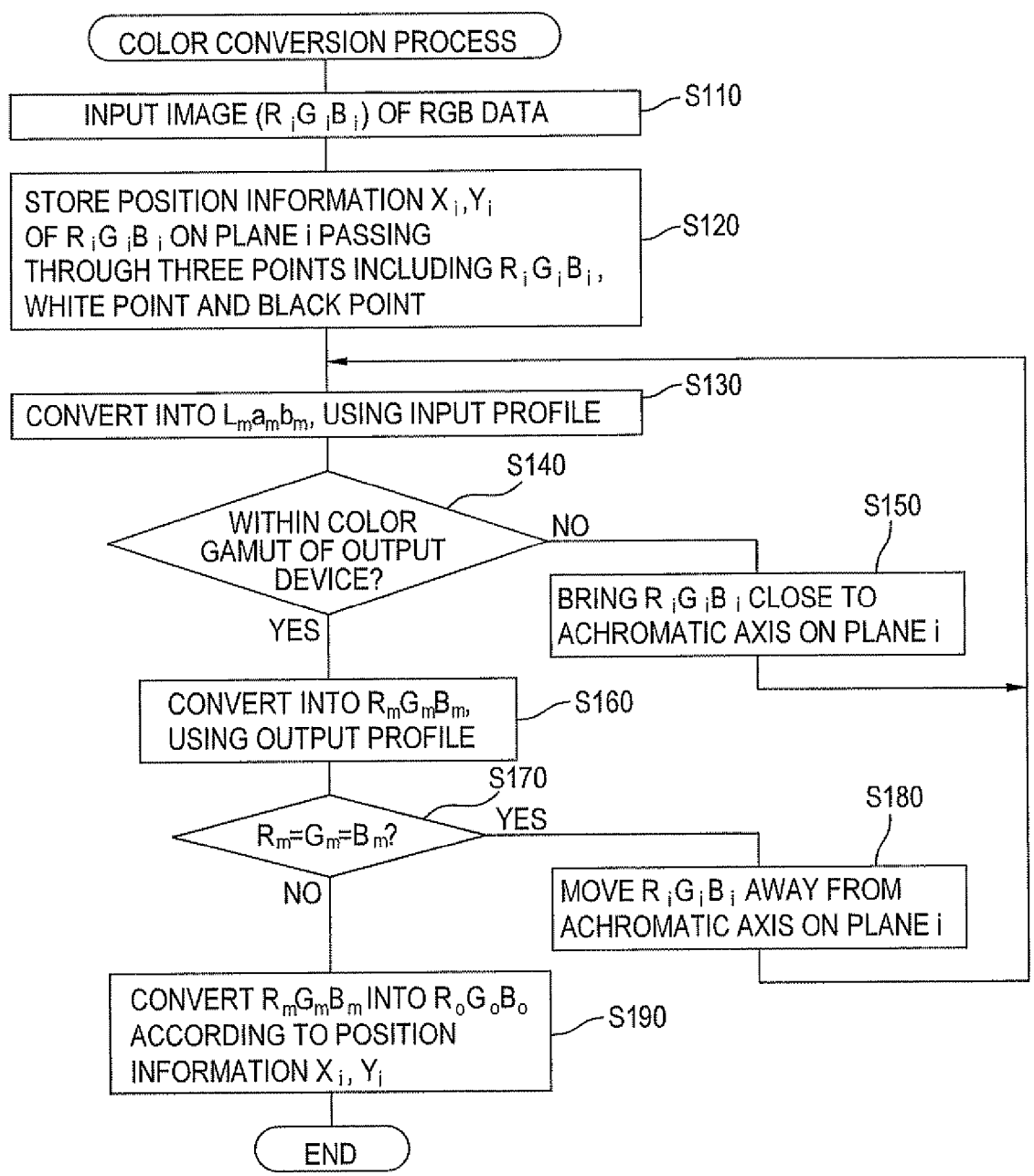
FIG. 3 is a flowchart of a color conversion process according to the embodiment.

Now, the color conversion process will be described below in greater detail. FIG. 3 is a flowchart of the color conversion process that the control section 11 (more specifically, CPU 12) of the personal computer 10 executes.

When the CPU 12 starts the color conversion process, the CPU 12 firstly inputs in S110 an input RGB data set $(R_i G_i B_i)$ in the device color space (input RGB space) that is dependent on the display device 16.

Figure 4:
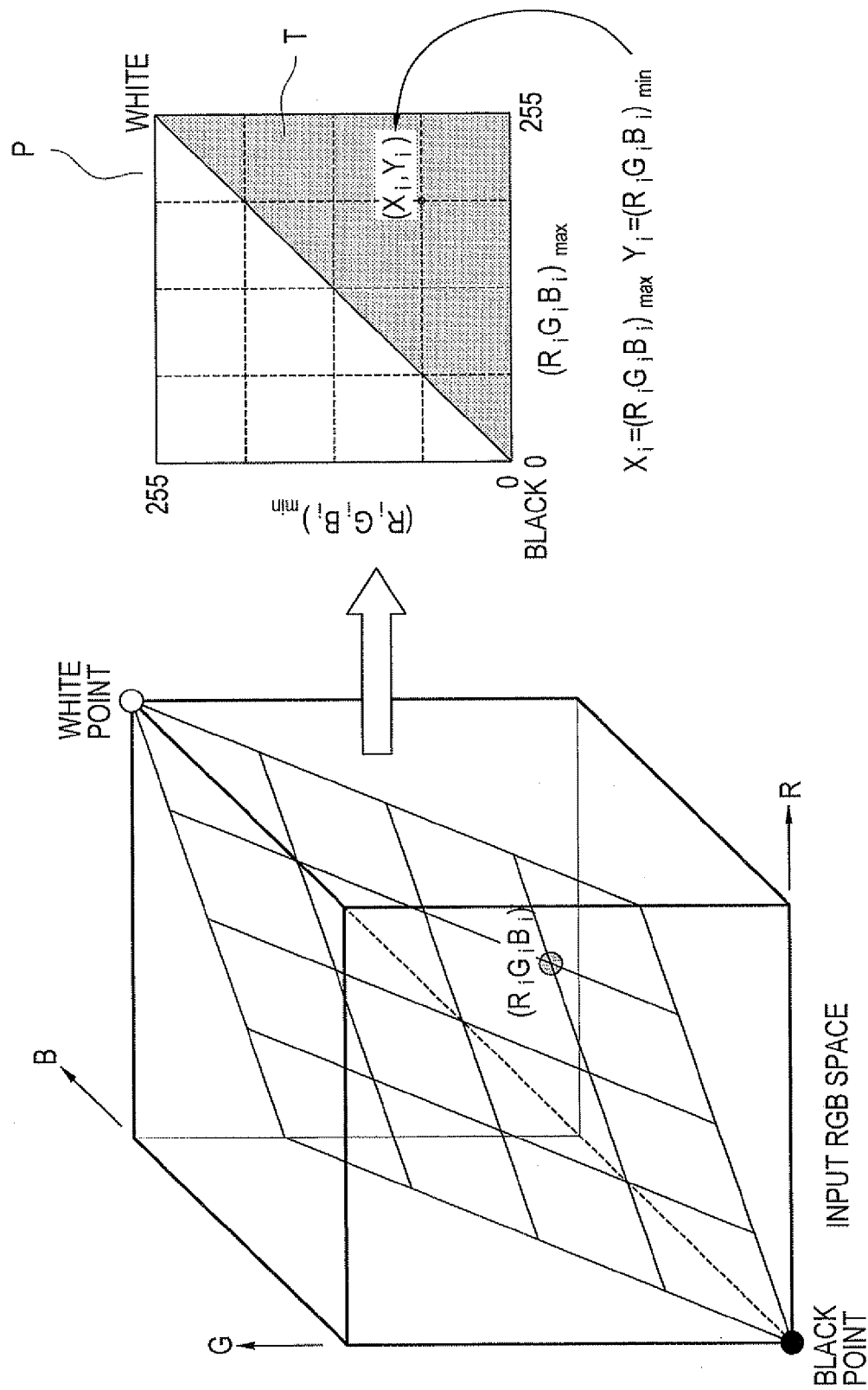
FIG. 4 is a schematic illustration of a process for identifying the two-dimensional position of input RGB data.

Subsequently, in S120, the CPU 12 identifies the plane i that passes through the three points including the white point, the black point and the input RGB data point $(R_i G_i B_i)$ in the input RGB space as shown in the left side of FIG. 4. Then, the CPU 12 identifies the two-dimensional position $(X_i, Y_i)$ of the input RGB data point on the plane i, and stores data of the two-dimensional position $(X_i, Y_i)$ in the memory device 18 as position information.

Figure 5:
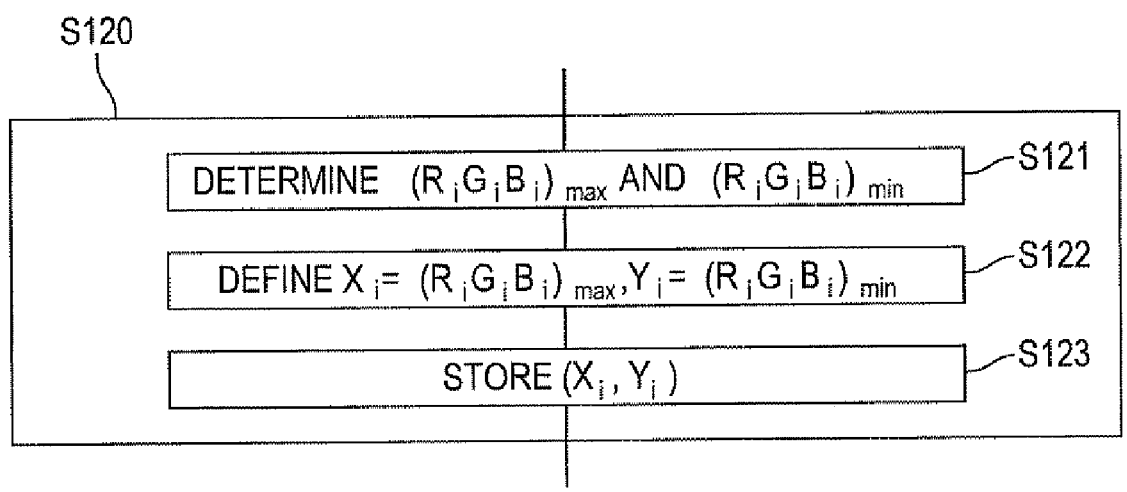
FIG. 5 is a flowchart of the process of S120 in FIG. 3, specifically illustrating how the process proceeds.

More specifically, in S120 the CPU 12 executes the processing operations of S121 through S123 as shown in FIG. 5. That is, in S121, the CPU 12 identifies the maximum value $(R_iG_iB_i)_{max}$ and the minimum value $(R_iG_iB_i)_{min}$ among the three-dimensional coordinate values $R_i$, $G_i$, and $B_i$ in the input RGB data.

Then, in S122, the CPU 12 sets the maximum value $(R_iG_iB_i)_{max}$ and the minimum value $(R_iG_iB_i)_{min}$ identified in S121 as $X_i$ and $Y_i$ among the two-dimensional position $(X_i, Y_i)$, respectively.

In other words, the CPU 12 identifies the two-dimensional position of the input RGB data on a projected plane P of the input RGB space as the two-dimensional position of the input RGB data on the plane i. As shown in the right side of FIG. 4, the input RGB space is projected on the projected plane P along the axial direction of the color of the medium value among the three-dimensional coordinate value $R_i$, $G_i$, and $B_i$ of the input RGB data. In other words, the projected plane P is defined as viewed from the axial direction of color of the medium value among the three-dimensional coordinate values $R_i$, $G_i$, and $B_i$ of the input RGB data. The direction of the color of the medium value among the three-dimensional coordinate values $R_i$, $G_i$, and $B_i$ extends perpendicularly to the projected plane P. The horizontal axis of the projected plane is along the direction of the color of the maximum values $(R_iG_iB_i)_{max}$, and the vertical axis of the projected plane is along the direction of the color of the minimum value $(R_iG_iB_i)_{min}$. The input RGB data point $(R_iG_iB_i)$ is projected on the projected plane P within a rectangular triangular range T having two vertexes that are projected positions of the white point and the black point as shown in the right side of FIG. 4. The two-dimensional position of the input RGB data point, projected on the plane P, is set as the two-dimensional position $(X_i, Y_i)$ of the input RGB data point on the plane i. With this definition, the two-dimensional position $(X_i, Y_i)$ can be uniquely identified.

Figure 6:
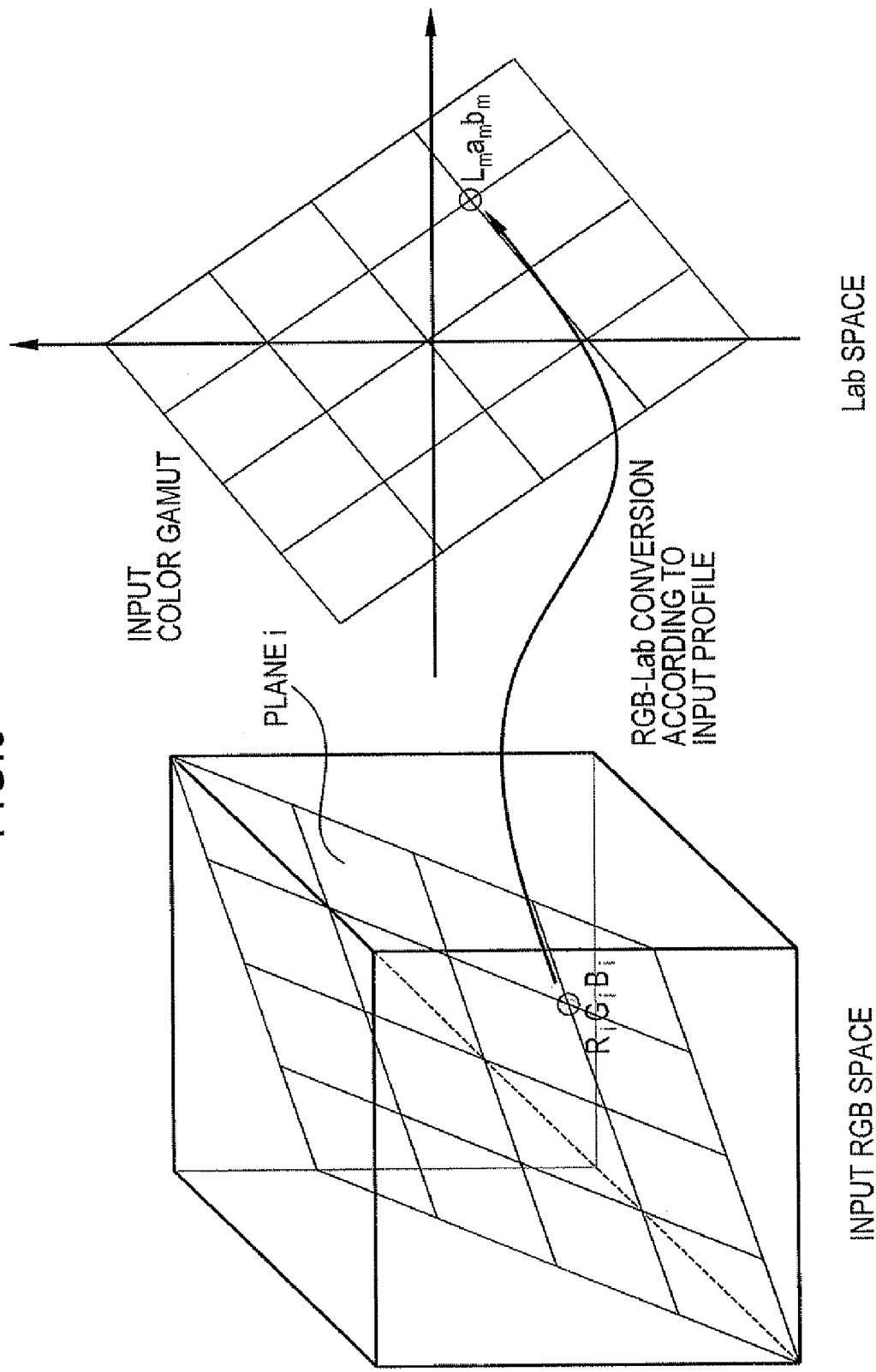
FIG. 6 is a schematic illustration of a process of converting input RGB data into intermediate Lab data.

Thereafter, in S123, the CPU 12 stores data of the two-dimensional position $(X_i, Y_i)$ identified in s122 in the memory device 18. After executing the above-described process of S120, the CPU 12 converts in S130 the input RGB data $(R_iG_iB_i)$ into intermediate Lab data $(L_m a_m b_m)$ indicative of a point of the input RGB data $(R_iG_iB_i)$ in the CIELAB space, as shown in FIG. 6, by means of RGB-Lab conversion using the input profile.

Figure 7A:
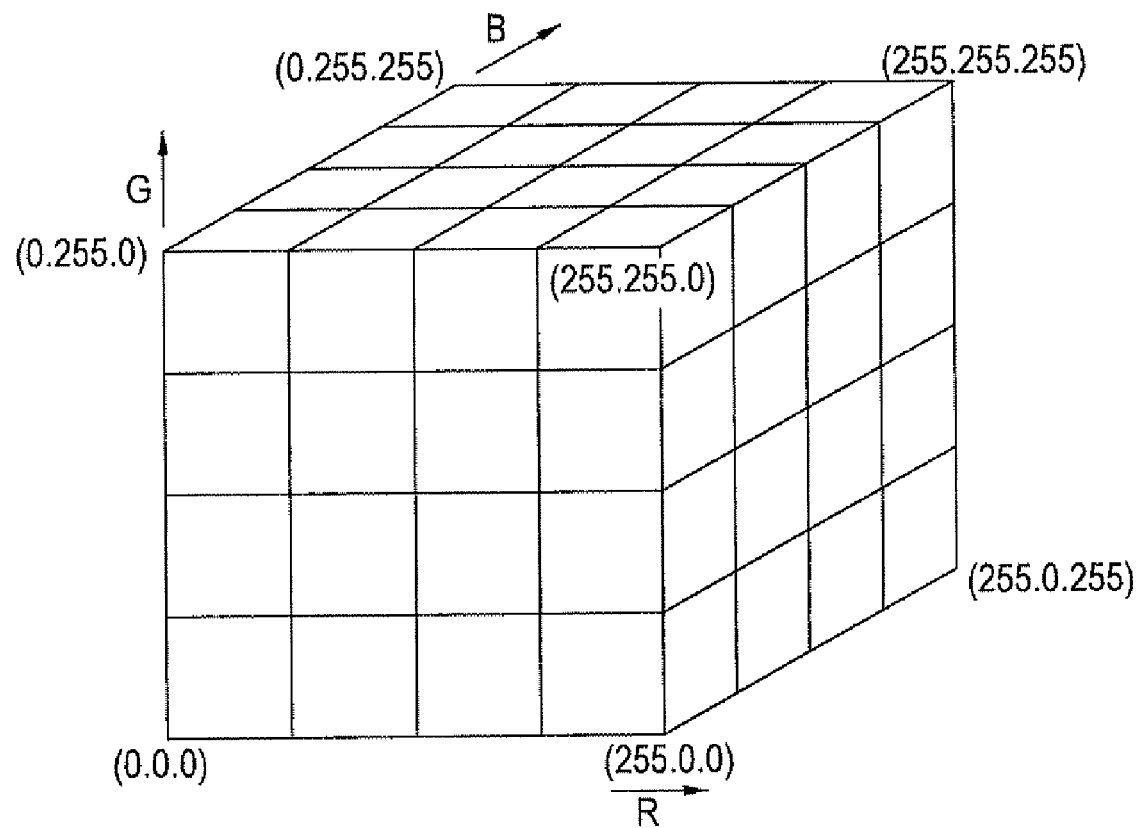
Figure 7B:
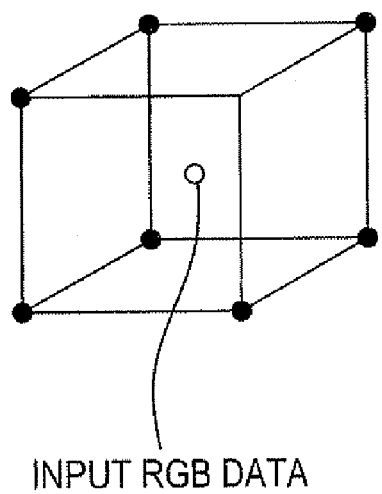

More specifically, converting the input RGB data $(R_iG_iB_i)$ into the intermediate Lab data $(L_m a_m b_m)$ employs the input profile that is in the form of a three-dimensional look-up-table as shown in FIG. 7(a). A plurality of sets of Lab data (L a b) is stored in the three-dimensional look-up table in one to one correspondence with a plurality of sets of RGB data (R G B). As shown in FIG. 7(b) if the input RGB data $(R_iG_iB_i)$ is not equal to any of the RGB data sets (grid points) stored in the input profiler the CPU 12 calculates the Lab data $(L_m a_m b_m)$ for the input RGB data $(R_iG_iB_i)$ by using interpolation calculation such as a cube interpolation or a triangular pyramid interpolation. In the case of cube interpolation, the CPU 12 selects eight RGB grid points that surround the input RGB data $(R_iG_iB_i)$ and performs interpolation calculation on the eight sets of Lab data that correspond to the surrounding eight RGB grid points.

Figure 8:
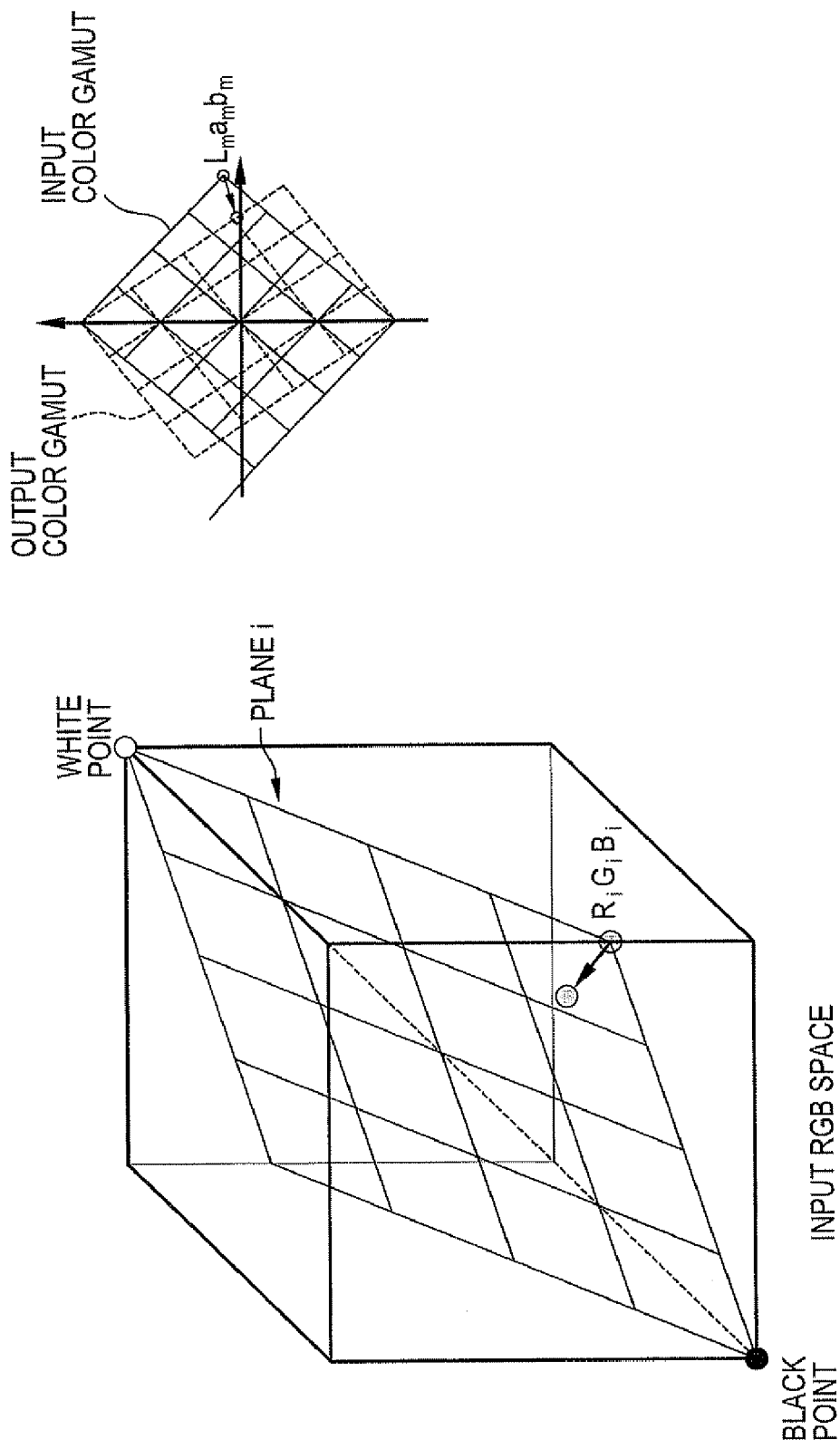
FIG. 8 is a schematic illustration of a process of correcting input RGB data in a direction toward an achromatic axis.

In S140, the CPU 12 determines whether or not the intermediate Lab data $(L_m a_m b_m)$ obtained in S130 exists in the color gamut of the output device. When the CPU 12 determines that the intermediate Lab data $(L_m a_m b_m)$ is not in the color gamut of the output device (no in S140), the CPU 12 moves to S150, where the CPU 12 executes a process of correcting the input RGB data $(R_iG_iB_i)$ so as to bring the input RGB data close to the achromatic axis (straight line passing through the black point and the white point) on the plane i of the input RGB space as shown in FIG. 8. More specifically, the CPU 12 moves the input RGB data $(R_iG_iB_i)$ by a predetermined quantity in a direction orthogonal to the achromatic axis. The distance, by which the CPU 12 moves the input data $(R_iG_iB_i)$ toward the achromatic axis, has to be smaller than the distance between the input RGB data $(R_iG_iB_i)$ and the achromatic axis. For example, the moving distance may be set equal to a portion (x %, where 0<x<100) of the distance between the input RGB data $(R_iG_iB_i)$ and the achromatic axis. The moving distance is preferably smaller than a grid interval of the input profile used in S130. Thereafter, the CPU 12 returns to S130. In this way, the CPU 12 corrects the input RGB data in a direction to bring the input RGB data into the color gamut of the output device. Then, the CPU 12 converts in S130 the corrected RGB values (the values obtained by correcting the input RGB data in S150), instead of the original input RGB data (the input RGB data before the correction of S150), into an intermediate Lab data set $(L_m a_m b_m)$. If the corrected values still fail to fall within the color gamut of the output de-rice (no in S140), the CPU 12 further corrects the corrected input RGB data set $(R_iG_iB_i)$ in S150.

Figure 9:
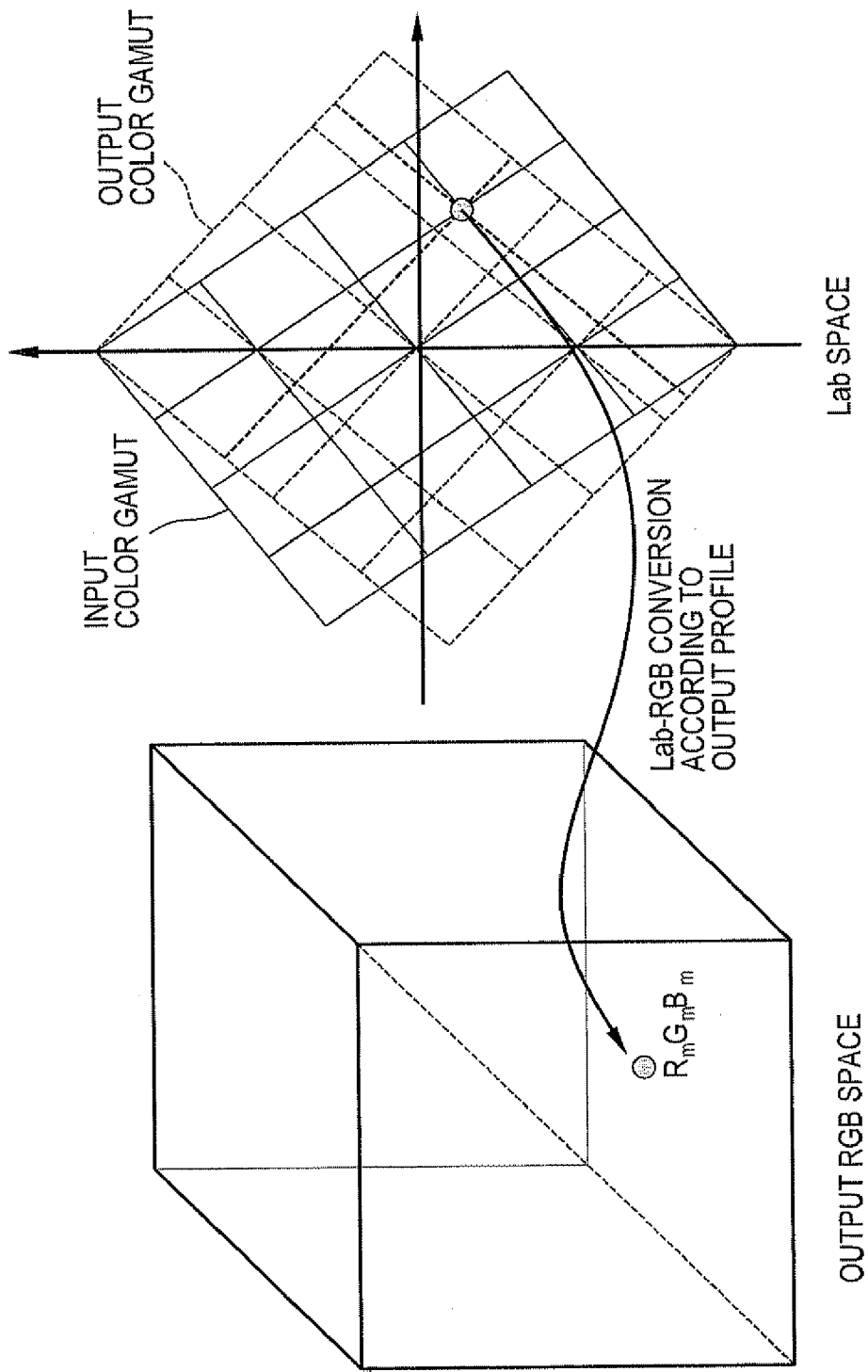
FIG. 9 is a schematic illustration of a process of converting intermediate Lab data into intermediate RGB data.

If, on the other hand, in S140, the intermediate Lab data $(L_m a_m b_m)$ is determined to exist in the color gamut of the output device (yes in S140), the CPU 12 moves to S160, where the CPU 12 executes the process of converting the intermediate Lab data $(L_m a_m b_m)$ into a set of intermediate RGB data $(R_m G_m B_m)$ defined in a device color space (output RGB space) that depends on the color printer 30, as shown in FIG. 9, by means of Lab-GOB conversion using an output profile.

The process of Lab-RGB conversion is similar to the above-described RGB-Lab conversion. The CPU 12 converts the intermediate Lab data $(L_m a_m b_m)$ into the set of intermediate RGB data $(R_m G_m B_m)$ using a three-dimensional look-up-table which sets a plurality of sets of RGB data in one to one correspondence with a plurality of sets of Lab data. When necessary, the CPU 12 performs an interpolation calculation in a manner similar to that described above for the RGB-Lab conversion. The process of RGB-Lab conversion of S130 and the process of Lab-RGB conversion of S160 ensure that color outputted by the target device based on the input RGB data $(R_iG_iB_i)$ will be viewed the same color as color outputted by the output device based on the intermediate RGB data $(R_m G_m B_m)$, which is obtained by subjecting the input RGB data $(R_iG_iB_i)$ to the processes of S130 and S160.

Subsequently, in S170, the CPU 12 determines whether or not the coordinate values $R_m$, $G_m$, and $B_m$ in the intermediate RGB data $(R_m G_m B_m)$ obtained in S160 are equal to one another $(R_m G_m B_m)$. In other words, the CPU 12 determines whether or not the intermediate RGB data $(R_m G_m B_m)$ exists on the achromatic axis of the output RGB space (the straight line passing through the black point and the white point in the output RGB space).

Figure 10:
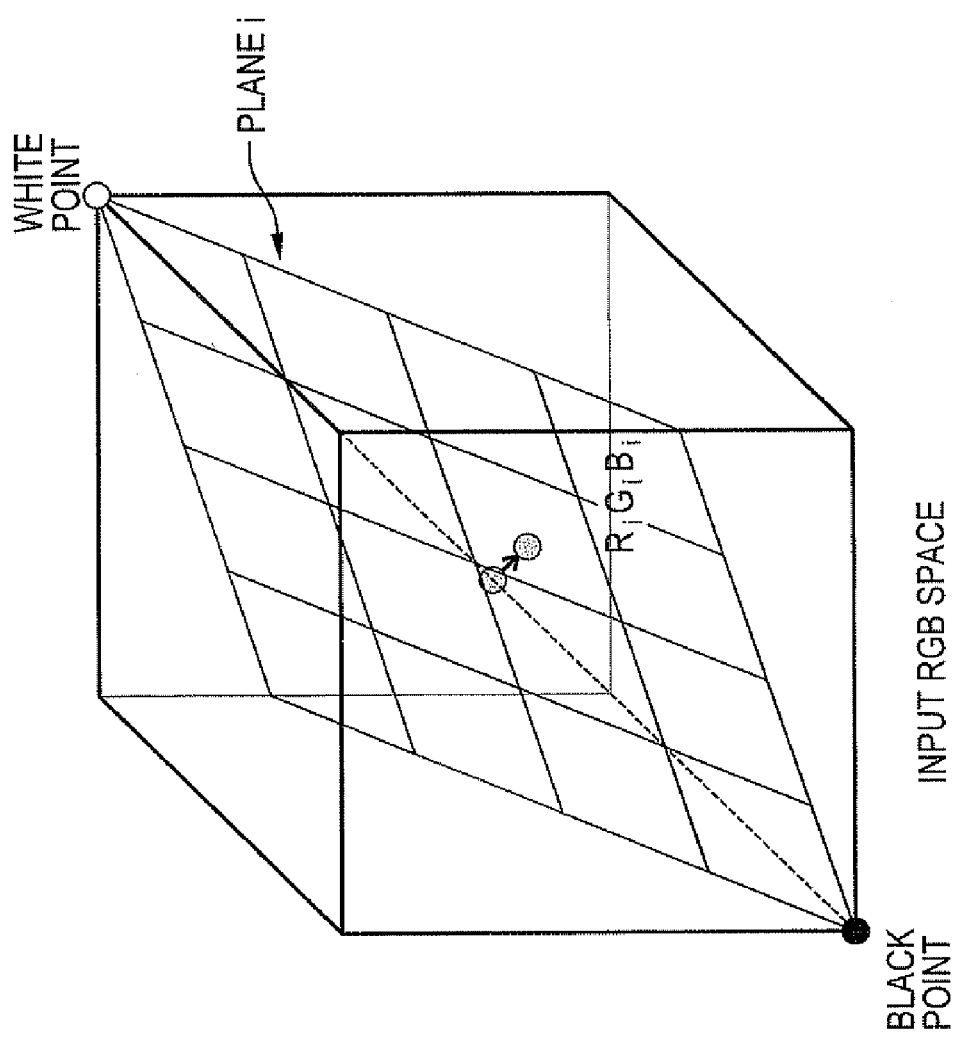
FIG. 10 is a schematic illustration of a process of correcting input RGB data in a direction away from the achromatic axis.

If the intermediate RGB data set $(R_m G_m B_m)$ satisfies the relationship of $R_m = G_m = B_m$ (yes in S170), the CPU 12 moves to S180. In S180, the CPU 12 executes a process of correcting the input RGB data $(R_iG_iB_i)$ so as to move the input RGB data away from the achromatic axis on the plane i of the input RGB space as shown in FIG. 10. More specifically, the CPU 12 moves the input RGB data $(R_iG_iB_i)$ by a predetermined quantity away from the achromatic axis along a direction orthogonal to the achromatic axis. The CPU 12 sets as small as possible the distance, by which the CPU 12 moves input RGB data $(R_iG_iB_i)$ away from the achromatic axis in S180. For example, the CPU 12 sets the distance, by which the CPU 12 moves the input RGB data away from the achromatic axis in S180, shorter than the distance, by which the CPU 12 moves the input RGB data toward the achromatic axis in S150.

Thereafter, the CPU 12 returns to S130. As a result, the intermediate RGB data ($R_m G_m B_m$) that corresponds to the input RGB data ($R_i G_i B_i$) is corrected to a position off the achromatic axis. Then, the CPU 12 converts in S130 the corrected values (the values obtained by correcting the input RGB data in S180), instead of the original input RGB data (the input RGB data before the correction of S180), into a set of intermediate Lab data ($L_m a_m b_m$). This ensures that a plane m can reliably be identified in S190 as will be described hereinafter.

Figure 11:
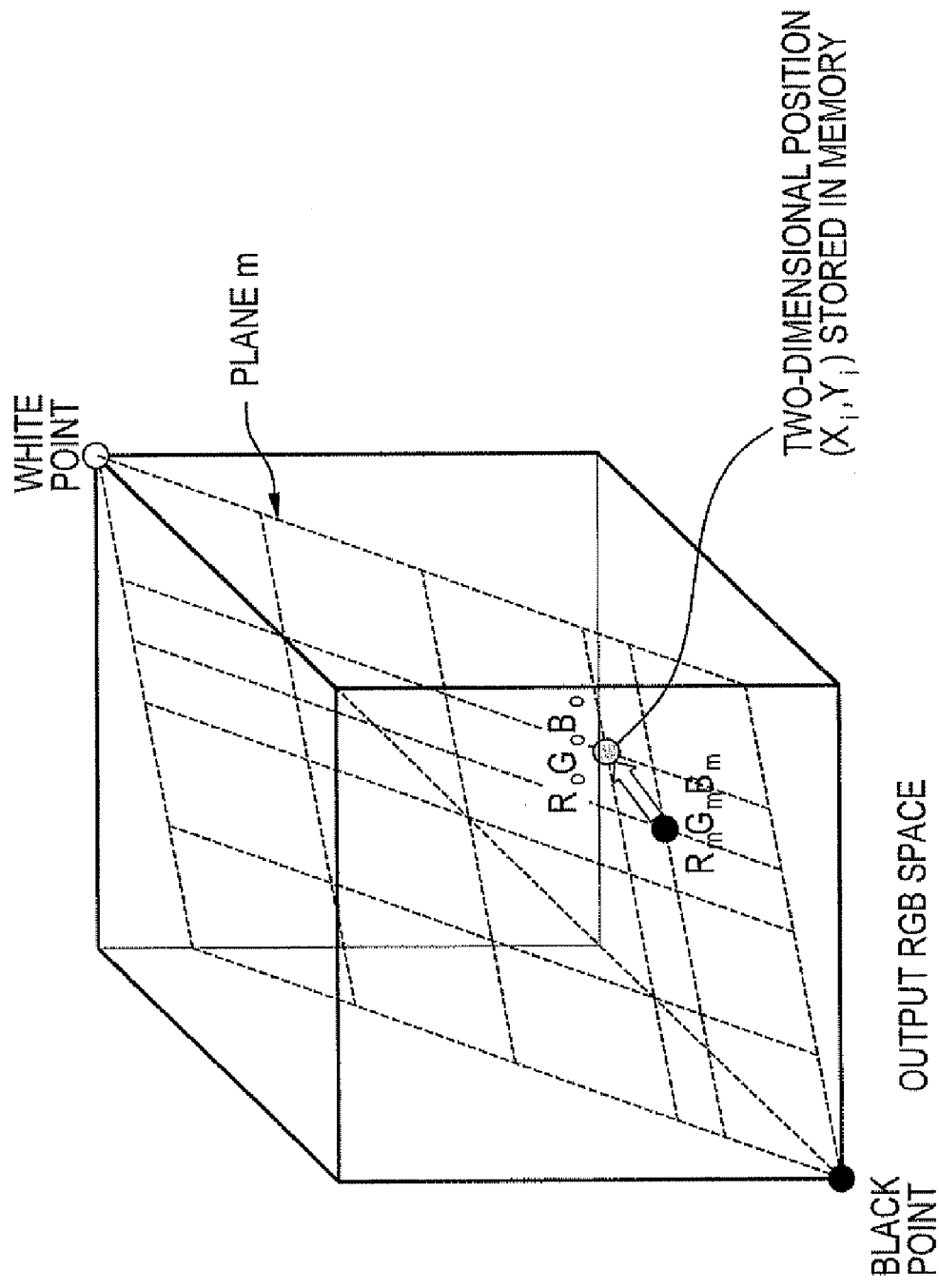
FIG. 11 is a schematic illustration of a process of determining output RGB data.

If, on the other hand, the intermediate RGB data set ($R_m G_m B_m$) does not satisfy the relationship of $R_m = G_m = B_m$ (no in S170), the CPU 12 moves to S190. In S190, the CPU 12 identifies the plane m that passes through the white point, the black point and the intermediate RGB data ($R_m G_m B_m$) in the output RGB space as shown in FIG. 11. Then, the CPU 12 determines, on the plane m, a set of output RGB data ($R_o G_o B_o$) whose position corresponds to the two-dimensional position ($X_i, Y_i$) that is stored in the memory device 18 in S120 (S123).

Figure 12:
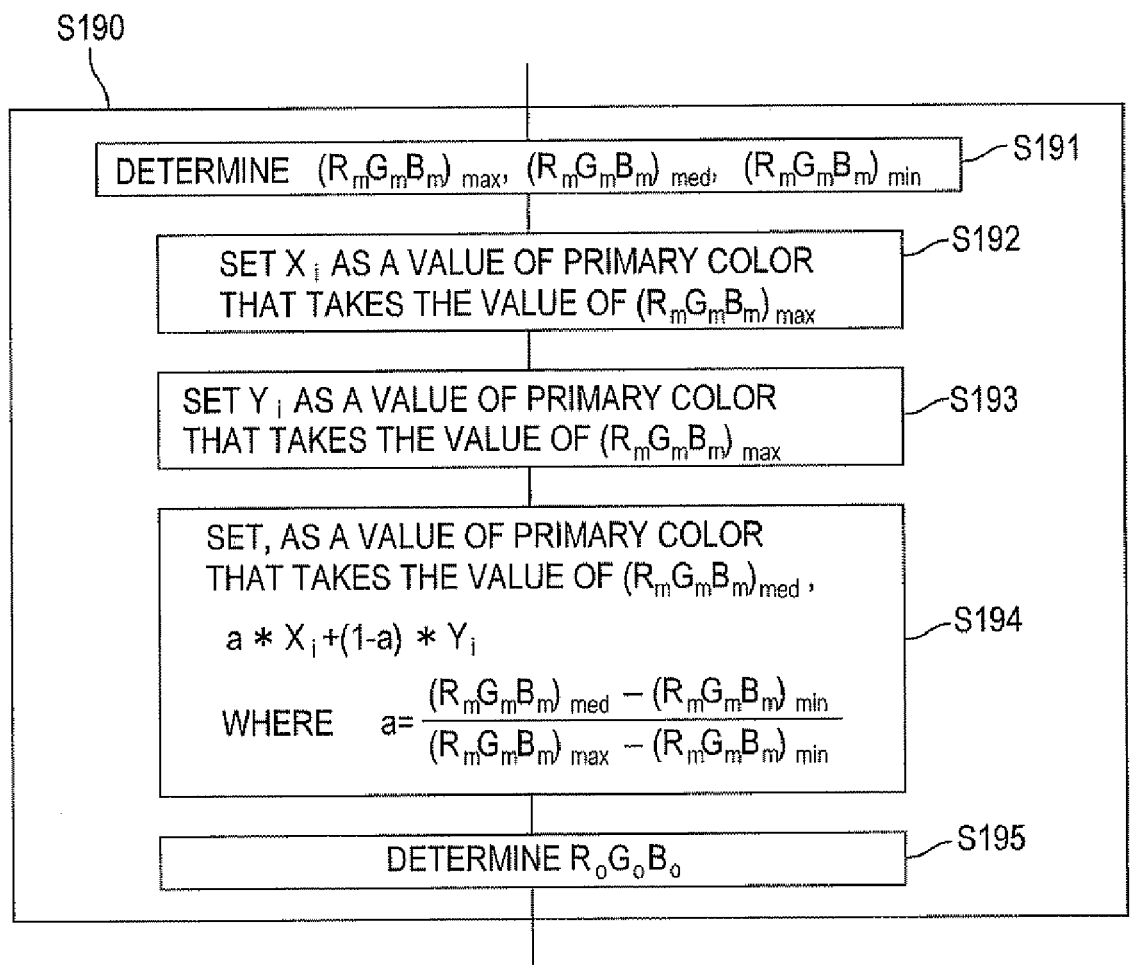
FIG. 12 is a flowchart of the process of S190 in FIG. 3, specifically illustrating the process in detail.

More specifically, in S190 the CPU 12 executes the processes of S191 through S195 as shown in FIG. 12. In S191, the CPU 12 identifies the maximum value ($R_m G_m B_m$)$_{max}$, the medium value ($R_m G_m B_m$)$_{med}$, and the minimum value ($R_m G_m B_m$)$_{min}$ among the three-dimensional coordinate values $R_m$, $G_m$, and $B_m$ in the intermediate RGB data ($R_m G_m B_m$) in the output RGB space.

Subsequently, in S192, the CPU 12 sets $X_i$ as the value of primary color that takes the maximum value ($R_m G_m B_m$)$_{max}$. Then, in S193, the CPU 12 sets $Y_i$ as the value of primary color that takes the minimum value ($R_m G_m B_m$)$_{min}$. Then, in S194, the CPU 12 sets, as the value of primary color that takes the medium value ($R_m G_m B_m$)$_{med}$, a value calculated by the following formula 1:

$$a * X_i + (1 - a) * Y_i \quad \text{[formula 1]}$$
$$\text{where } a = \frac{(R_m G_m B_m)_{med} - (R_m G_m B_m)_{min}}{(R_m G_m B_m)_{max} - (R_m G_m B_m)_{min}}$$

Subsequently, in S195, the CPU 12 determines output RGB data ($R_o G_o B_o$) based on the values of primary colors determined in S192 through 3194. The color conversion process ends after executing S190.

Figure 13:
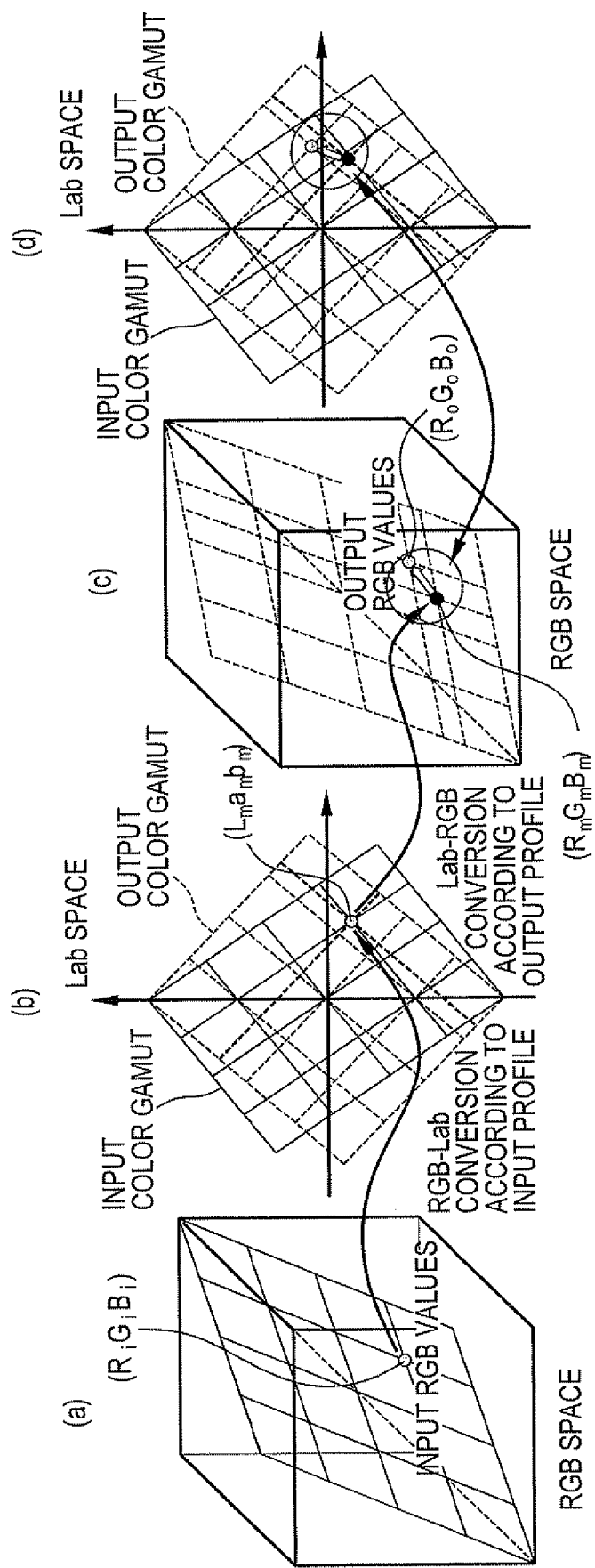
FIG. 13 shows how the color conversion process of the embodiment proceeds.

As described above, the personal computer 10 converts the input RGB data ($R_i G_i B_i$) in the input RGB space into the output RGB data ($R_o G_o B_o$) in the output RGB space. More specifically, as shown in FIG. 13, the personal computer 10 first converts the input RGB data ($R_i G_i B_i$) defined in the RGB space as shown in (a) of FIG. 13 into the intermediate Lab data ($L_m a_m b_m$) shown in (b) of FIG. 13 by using the input profile. The personal computer 10 then converts the intermediate Lab data into the intermediate RGB data ($R_m G_m B_m$) shown in (c) of FIG. 13 by using the output profile. Then, the personal computer 10 converts the intermediate RGB data ($R_m G_m B_m$) into the output RGB data ($R_o G_o B_o$) as shown in (c) of FIG. 13-Conversion (mapping) of the intermediate RGB data ($R_m G_m B_m$) to the output RGB data ($R_o G_o B_o$) in the output RGB space is equivalent to conversion (mapping) of a color point to another color point in the Lab color space as shown in (d) of FIG. 13.

The CPU 12 identifies the two-dimensional position $X_i, Y_i$ of the input RGB data on the plane i that passes through the white point, the black point and the input RGB data of the input RGB space. The personal computer 10 temporarily converts the input RGB data into intermediate Lab data ($L_m a_m b_m$) that represents the point of the input RGB data in the CIELAB space and then converts the intermediate Lab data into intermediate RGB data ($R_m G_m B_m$) that represents the point of the input RGB data in the output RGB space. Then, the CPU 12 sets output RGB data ($R_o G_o B_o$), whose position corresponds to the two-dimensional position ($X_i, Y_i$) on the plane m that passes through the white point, the black point and the intermediate RGB data in the output RGB space.

With the above-described color conversion process, a color in the input RGB space in converted into a color in the output RGB space through the Lab device-independent color space so that the two colors are the same in the Lab device-independent color space. That is, the input RUB data ($R_i G_i B_i$) (input RGB values) defined in the input RGB space as shown in (a) of FIG. 13 is converted through the CIELAB space (b) of FIG. 13 into the intermediate RGB data ($R_m G_m B_m$) defined in the output RGB space as shown in (c) of FIG. 13 so that the two colors are the same as defined by the intermediate Lad data set ($L_m a_m b_m$) in the CIELAB space as shown in (b) of FIG. 13. Since the CIELAB space is a device-independent color space, color in one device can be converted into color in another device so that the two colors are the same in the device-independent color space.

Additionally, a gamut mapping process is executed on a constant hue plane that is defined in the RGB space, while maintaining the color gradations. Color gradations can be easily maintained even in such regions where the contour of the color gamut of the input RGB space largely differs from that of the color gamut of the output RGB space to a large extent Note that, priority is given to the maintenance of the color gradations although the hues may vary slightly in the device-independent color space.

More specifically, the output RGB data ($R_o G_o B_o$) is identified on the plane m that passes through the white point, the black point and the intermediate RGB data in the output RGB space. The plane m is a constant hue plane in the output RGB space. That is, all the points on the plane m have the same hue in the output device color space. A gamut mapping process is executed so as to make the two-dimensional position of the output RGB data in the color gamut of the output RGB space (more specifically, the color gamut on the plane ma) correspond to the two-dimensional position of the input RGB data in the color gamut of the input RGB space (more specifically, the color gamut on the plane a) as shown in (c) of FIG. 13. As a result, a gamut mapping process can be realized to maintain the hues and the color gradations in the device-dependent color spaces for both of the input device and output device.

This method will be described below in comparison with a conventional method. The conventional gamut mapping shifts color points on a hue constant plane in the CIELAB space in fixed directions. One example of the conventional gamut mapping shifts the color points in a direction of saturation while maintaining the lightness of the color points. Another example of the conventional gamut mapping shifts color points toward or away from a point of convergence defined on an achromatic axis. However, according to the conventional method there arises a problem that the color gradations are degraded in the device-independent color space when the color gamut of the device has a complex contour or when the color gamut of the input device differs largely from the color gamut of the output device. To the contrary, with the color conversion process of this embodiment as shown in (c) and (d) of FIG. 13, a gamut mapping process is executed so as to move the intermediate RGB data on the plane m in the output RGB space to a position that corresponds to the two-dimensional position of the input RGB data on the plane i in the input RGB space. Unlike the conventional gamut mapping of compressing or expanding the color gamut in fixed directions in the CIELAB space, the gamut mapping of the present embodiment can easily maintain the color gradations even in such regions where the contour of the color gamut in the input RGB space and the contour of the color gamut in the output RGB space differ to a large extent from each other.

This effect will be described in greater detail with reference to FIGS. 14(a) through 14(d) and FIG. 15. In FIGS. 14(a) through 14(d), the color gamuts of the input device and of the output device are expressed as views obtained by cutting the Lab space by lightness L and saturation C for the purpose of simplicity. Of the RGB values in each RGB data set distributed in the color gamut of the input device, the maximum value and the minimum value are expressed respectively by $X_i$ and $Y_i$. Of the RGB values in each RGB data set distributed in the color gamut of the output de-vice, the maximum value and the minimum value are expressed respectively by $X_o$ and $Y_o$. FIG. 15 is a graph showing $X_i$-$X_o$ relationships indicating how the value $X_i$ in a curve of $Y_i$=0 in the input color gamut is converted to the value $X_o$ in output color gamut through the gamut mapping of the present embodiment (broken line) and through the gamut mapping of the conventional method (solid line).

Figure 14A:
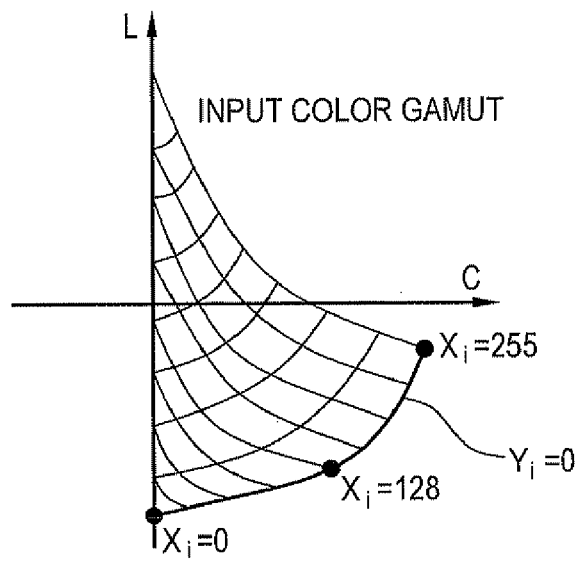
Figure 14B:
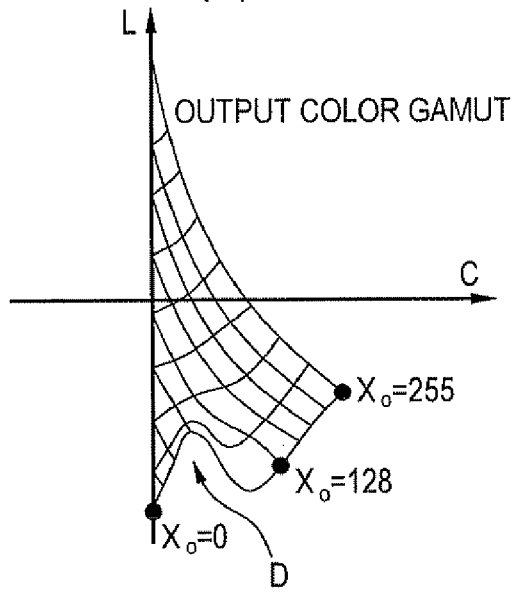
Figure 14C:
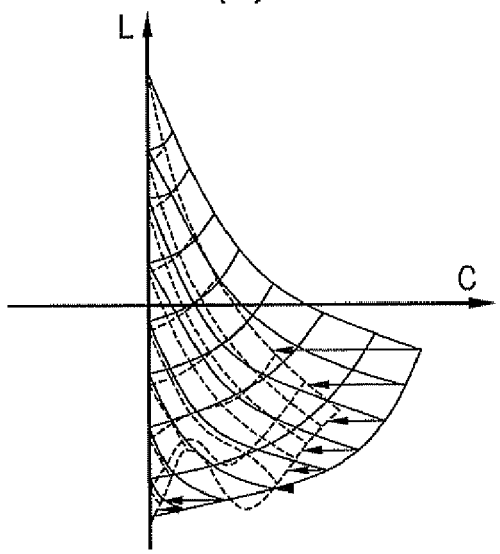
Figure 14D:
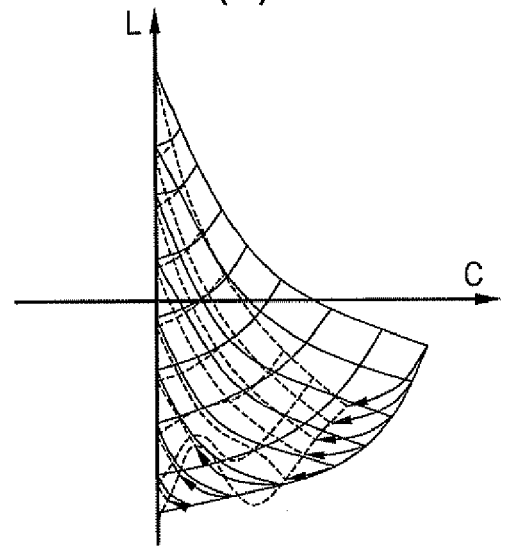
Figure 15:
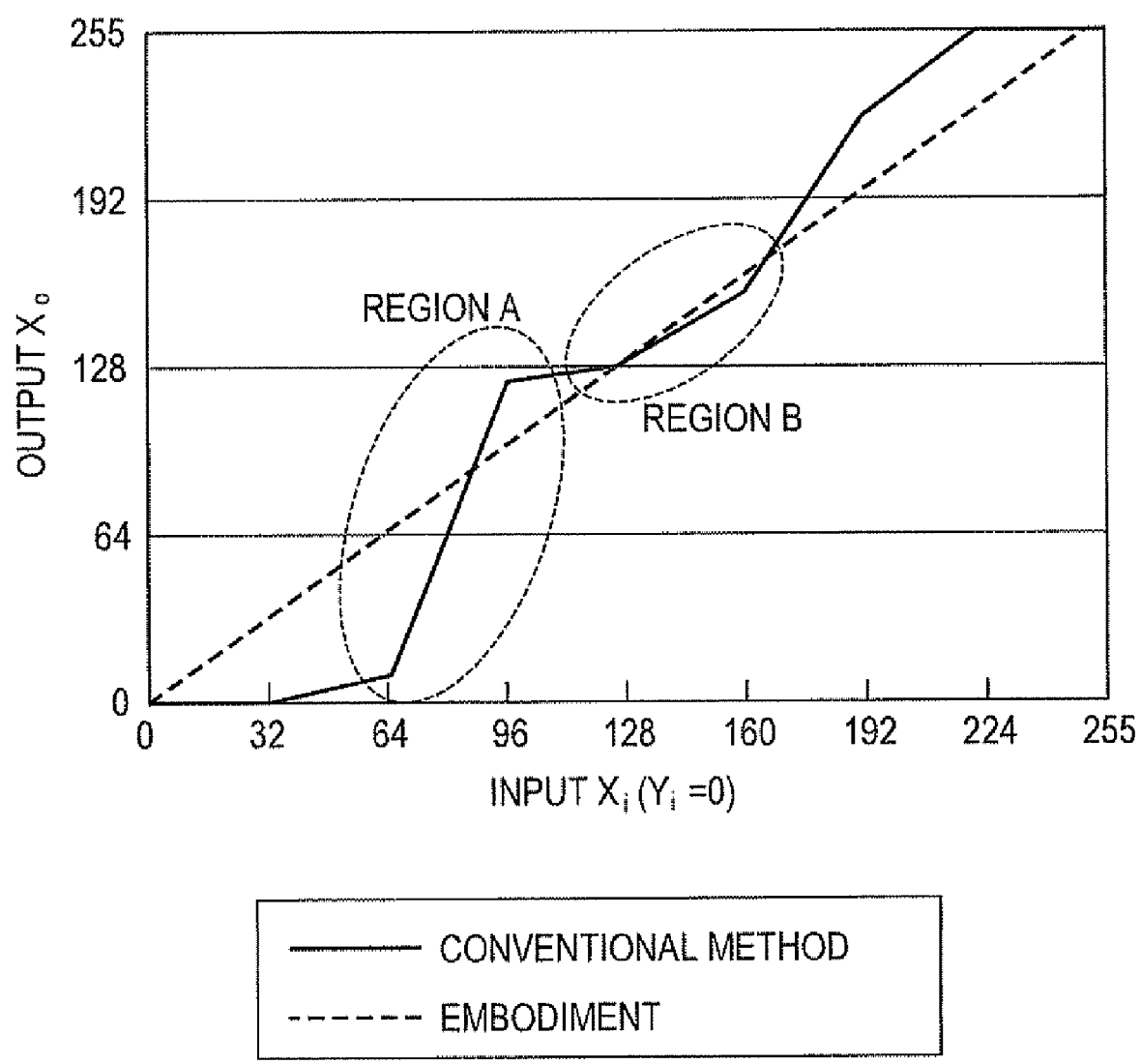
FIG. 15 is a schematic illustration of a relationship between input values and output values through gamut mapping according to the embodiment and according to the conventional method.

Now assume that the contour of the output color gamut has a concave portion D as shown in FIG. 14(b) while the contour of the input color gamut has no concave portion as shown in FIG. 14(a). With the conventional method, the gamut mapping is realized in the direction of saturation in the CIELAB space while maintaining the lightness on the hue constant plane as shown in FIG. 14(c). As a result, the inclination of the $X_i$-$X_o$ curve differs in region A and region B remarkably from each other as indicated by the solid line in FIG. 15. This means that gamut mapping damages the relationship between the input values $X_i$ and the output values $X_o$. The output values $X_o$ fails to reproduce the smooth gradation of the input values $X_i$. To the contrary, with the color conversion process of this embodiment, gamut mapping is executed in such a way that the two-dimensional position on the plane m of the output RGB data is made to correspond to the two-dimensional position on the plane i of the input RGB data as shown in FIG. 14(d). So, the output device colors X obtained after the gamut mapping become linear relative to the input device color $X_i$ as shown in FIG. 15, to thereby maintain the color gradations in the device colors.

Maintaining color gradations in the device colors is more effective for gamut mapping than maintaining the color gradations in a device-independent color space, a uniform color space, and/or the sense of sight.

With the color conversion process of this embodiment, when the intermediate Lab data is determined to not exist in the color gamut of the output RGB space, the input RUB data is corrected in a direction toward the achromatic axis of the input RGB space on the plane i. The corrected input RGB data is converted into the intermediate Lab data indicative of a point of the corrected input RGB data in the CIELAB space. With such a color conversion process, any input RGB data, for which the intermediate Lab data does not exist in the color gamut of the output RGB space, can be subjected to color conversion just like the input RGB data for which the intermediate Lab data exists in the color gamut of the output RGB space.

Additionally, with the color conversion process of this embodiment, when the intermediate RGB data is determined to exist on the achromatic axis of the output RGB space, the input RGB data is corrected in a direction away from the achromatic axis of the input RGB space on the plane i. Instead of the original input RGB data, the corrected input RGB data is converted into the intermediate Lab data indicative of a point in the CIELAB space. With such a color conversion process, the plane m that passes through the white point, the black point and the intermediate RGB data in the output RGB space can be reliably identified.

Additionally, with the color conversion process of this embodiment, the maximum value and the minimum value among the three-dimensional coordinate values of the input RGB data in the input RGB space are identified as the two-dimensional coordinate values of the input RGB data indicative of a two-dimensional position of the input RGB data. With such a color conversion process, the twos dimensional position of the input RGB data on the plane i can be identified easily.

While the invention has been described in detail with reference to the embodiment thereof, it would be apparent to those skilled in the art that various changes and modifications may be made therein without departing from the spirit of the invention.

For example, while the RGB space is employed as device color space both for the input device and the output device in the above-described embodiment, the present invention is not limited thereto and similar effects can be achieved for any other three-dimensional color spaces such as a CMY space and the like.

While the CIELAB space is employed as the device-independent space in the above-described embodiment, the present invention is not limited thereto and a Lab space, a CIEXYZ space, a CIECAM02 space or some other space may alternatively be employed.

The color conversation program 22 may be stored in various types of computer readable medium, other than the hard-disk device, such as a CD-ROM, DVD, or the like.

What is claimed is:

1. A color conversion apparatus for converting an input point defined in a three-dimensional first color space into an output point defined in a three-dimensional second color space, the color conversion apparatus comprising:
   a position identifying unit that identifies a two-dimensional position for an input point defined in a three-dimensional first color space, the two-dimensional position being defined on a specific plane passing through a first white point, a first black point and the input point, the first white point and the first black point being defined in the first color space;
   a first conversion unit that converts the input point into an intermediate point that is defined in a device-independent color space;
   a second conversion unit that converts the intermediate point into a temporary output point that is defined in a three-dimensional second color space; and
   an output point identifying unit that identifies, in the second color space, an output point, whose position, defined on a plane that passes through a second white point, a second black point and the temporary output point, corresponds to the two-dimensional position identified by the position identifying unit, the second white point and the second black point being defined in the second color space.

2. The color conversion apparatus according to claim 1, further comprising:
a color gamut determining unit that determines whether or not the intermediate point exists in a color gamut of the second color space;
wherein when the color gamut determining unit determines that the intermediate point exists out of the color gamut of the second color space, the first conversion unit shifts the input point on the specific plane in a direction toward a first straight line that passes through the first white point and the first black point in the first color space, and converts the shifted input point into the intermediate point.

3. The apparatus according to claim 1, further comprising:
a straight line determining unit that determines whether or not the temporary output point exists on a second straight line that passes through the second white point and the second black point in the second color space;
wherein when the straight line determining unit determines that the temporary output point exists on the second straight line, the first conversion unit shifts the input point on the specific plane in a direction away from the first straight line, and converts the shifted input point into the intermediate point.

4. The apparatus according to claim 1, wherein
the position identifying unit identifies, as the two-dimensional position of the input point on the specific plane, a two-dimensional position of the input point on a plane, onto which the first color space is projected in a direction along one of three predetermined axes constituting the three-dimensional first color space.

5. The apparatus according to claim 4, wherein
the position identifying unit identifies two-dimensional coordinate values indicative of the two-dimensional position of the input point, the two-dimensional coordinate values being equal to a maximum value and a minimum value among three-dimensional coordinate values of the input point in the first color space, one axis corresponding to a medium value among the three-dimensional coordinate values extending perpendicularly to the projected plane, onto which the input color space is projected.

6. A computer readable storage device storing a set of color conversion program instructions, the instructions comprising:
identifying a two-dimensional position for an input point defined in a three-dimensional first color space, the two-dimensional position being defined on a specific plane passing through a first white point, a first black point and the input point, the first white point and the first black point being defined in the first color space;
converting the input point into an intermediate point that is defined in a device-independent color space;
converting the intermediate point into a temporary output point that is defined in a three-dimensional second color space; and
identifying, in the second color space, an output point, whose position, defined on a plane that passes through a second white point, a second black point and the temporary output point, corresponds to the two-dimensional position identified by the position identifying unit, the second white point and the second black point being defined in the second color space.

* * * * *